United States Patent [19]

Chang

[11] Patent Number: 4,914,253

[45] Date of Patent: Apr. 3, 1990

[54] METHOD FOR PREPARING POLYETHYLENE WAX BY GAS PHASE POLYMERIZATION

[75] Inventor: Main Chang, Houston, Tex.

[73] Assignee: Exxon Chemical Patents Inc., Linden, N.J.

[21] Appl. No.: 267,216

[22] Filed: Nov. 4, 1988

[51] Int. Cl.$^4$ ................................................ C07C 2/02
[52] U.S. Cl. .................................... 585/523; 585/512; 585/524
[58] Field of Search ........................ 585/512, 523, 524

[56] References Cited

FOREIGN PATENT DOCUMENTS 0170059 2/1986 European Pat. Off. .

Primary Examiner—Curtis R. Davis
Attorney, Agent, or Firm—M. B. Kurtzman

[57] ABSTRACT

This invention relates to a process for preparing polyethylene wax having a narrow molecular weight distribution in a gas phase polymerization reactor. The invention particularly relates to the process of polymerizing ethylene in the presence of a supported metallocene-alumoxane catalyst and hydrogen. The catalyst may be derived from the addition of silica gel containing about 6 to about 20 percent by weight adsorbed water to a trialkylaluminum solution. An alumoxane coated silica gel is formed to which a metallocene may be added and the resulting material dried to free flowing powder. A trimethylaluminum pretreated metallocene may be employed when the trialkylaluminum is selected from the group consisting of triethylaluminum, tripropylaluminum, tri-n-butyl-aluminum, tri-isobutylaluminum, tri(2-methylpentyl)aluminum, trihexylaluminum, tri-n-octylaluminum and tri-n-decylaluminum.

12 Claims, No Drawings

METHOD FOR PREPARING POLYETHYLENE WAX BY GAS PHASE POLYMERIZATION

This invention relates to a gas phase polymerization process for preparing polyethylene wax with a narrow molecular weight distribution. In particular, the invention relates to a gas phase process of polymerizing ethylene in the presence of a supported metallocene-alumoxane catalyst derived from silica gel containing from about 5 to about 20 percent by weight adsorbed water. The catalyst system can be prepared by adding the silica gel to a trialkylaluminum solution to form, by direct reaction with the adsorbed water content of the silica gel catalyst support material, the alumoxane component of the catalyst system. An alumoxane coated silica gel is formed to which the metallocene is added and the resulting material dried to free flowing powder. The dry free-flowing powder is then used as the supported metallocene-alumoxane catalyst in the gas phase polymerization of ethylene. By adjusting the concentration of hydrogen during polymerization, a polyethylene wax having a narrow molecular weight distribution is obtained.

BACKGROUND OF THE INVENTION

The production of hydrocarbon waxes by the Fisher-Tropsch synthesis (FTS) is well known. In this process, hydrogen is reacted with carbon monoxide in the presence of a heterogeneous catalyst under specified procedural condition. The waxes resulting from this process have a narrow molecular weight distribution. The waxes produced in accordance with the process are readily available although costly.

To produce a polyethylene wax it is necessary to control the degree of polymerization of ethylene monomer to a number generally less than 360. Hence the average molecular weight of a polyethylene wax must generally not exceed about 10,000. Attempts to produce polyethylene waxes in a gas phase polymerization reactor employing traditional Ziegler-Natta catalysts result in fouling of the reactor by the fusing of the polyethylene wax in the reactor. The fusing of the polyethylene wax in the bed is due to the broad molecular weight distribution of the wax which contains undesirable but significant amounts of ethylene oligomers ($C_{10}$–$C_{32}$). The oligomer content of such polyethylene wax is a sticky material which causes the polyethylene wax to agglomerate.

It would be desirable to devise a low cost polymerization procedure for the production of polyethylene waxes having a narrow molecular weight distribution. It is further desirable to devise a catalytic process other than the FTS which process would manifest minimal fouling within the reactor.

SUMMARY OF THE INVENTION

In accordance with the present invention, a process for making polyethylene wax in a gas phase polymerization reactor has been discovered which process minimizes fouling within the reactor. The resulting polyethylene wax exhibits a narrow molecular weight distribution (MWD) and thus is very useful as a viscosity modifier in hot melt adhesives formulation and other application. The waxes of this invention will have an MWD of 5 or less and desirably less than 3.

The process of this invention is drawn to homopolymerizing ethylene to form wax in the presence of a catalytically effective amount of a supported metallocene-alumoxane catalyst.

The support material of the catalyst is comprised of silica particles having an average surface area in the range of about 10 $m^2/g$ to about 700 $m^2/g$, preferably about 100–500 $m^2/g$ and desirably about 200–400 $m^2/g$, a pore volume of about 3 to about 0.5 cc/g and preferably 2–1 cc/g and an adsorbed water content of from about 6 to about 20 weight percent, preferably from about 8 to about 15 weight percent. Such silica particles are referred to hereafter as an "undehydrated silica gel".

The silica gel supported metallocene-alumoxane catalyst may be prepared by adding the undehydrated silica gel to a stirred solution of trialkylaluminum in an amount sufficient to provide a mole ratio of trialkylaluminum to water of from about 3:1 to about 1:2, preferably 1.2:1 to about 0.9:1; thereafter adding to this stirred solution a metallocene in an amount sufficient to provide an aluminum to transition metal ratio of from about 1000:1 to 1:1, preferably from about 300:1 to 10:1, most preferably from about 150:1 to about 30:1, removing the solvent and drying the solids to a free-flowing powder. Drying can be obtained by modest heating or vacuum. The dried free-flowing powder comprises a metallocene-alumoxane catalyst complex adsorbed upon the surface of the silica gel support particles.

In a preferred embodiment of this invention, the metallocene is first contacted with trimethylaluminum ("TMA"). The contact product therefrom is then contacted with the contact product of triethylaluminum and the undehydrated silica. Such supported catalysts are less costly than and have activity at least comparable to those catalysts wherein the aluminum component consists essentially of methylalumoxane. In this embodiment, the undehydrated silica gel support material may be added to a stirred solution of triethylaluminum to form an ethylalumoxane coated silica gel. A metallocene is separately reacted in solution with TMA and the resulting metallocene-TMA product is admixed with the ethylalumoxane coated silica gel after which the solvent is removed and the solids dried to a free-flowing powder.

Ethylene is polymerized by contacting it in the gas phase with a supported metallocene-alumoxane as described at a polymerization temperature in the range of from about 25° C. to about 180° C. and a total reaction pressure of from about 100 to about 500 psi. During the course of reaction, a diluent gas such as nitrogen is added to control the concentration of ethylene. Hydrogen is also added to control molecular weight. The desired molecular weight of the resulting polymer is obtained by adding between about 100 ppm to about 100,000 ppm of hydrogen to the reactor during polymerization.

DETAILED DESCRIPTION OF THE INVENTION

The present invention is directed towards a gas phase polymerization process for preparing polyethylene wax having a narrow molecular weight distribution. In particular, the invention is directed towards a method of polymerizing ethylene in a gas phase polymerization reactor in the presence of a supported metallocene-alumoxane catalyst and hydrogen.

The molecular weight distribution, expressed as the ratio of the weight average molecular weight ("Mw") to the number average molecular weight ("Mn"), of the resulting polyethylene is generally less than about 5, preferably 3 or less than 3 and desirably between 2.3 and 2.9. As a result, the resulting wax is characterized by a narrow melting point range. Such polymeric products are suitable therefore as viscosity modifiers in hot melt adhesives formulation.

In the process of the present invention, ethylene is polymerized in the presence of a silica gel supported catalyst system comprising at least one metallocene and an alumoxane. Such catalyst systems are disclosed in co-pending U.S. patent application Ser. No. 34,413, filed Dec. 17, 1987 and U.S. patent application Ser. No. 268,834, filed Nov. 8, 1988. In particular, the complex of this invention comprises a metallocene and an alumoxane formed onto the surface of a silica gel support material.

Alumoxanes are oligomeric aluminum compounds represented by the general formula $(R-Al-O)_y$ which is believed to be cyclic compound and $R(R-Al-O-)_yAlR_2$, which is a linear compound. In the general formula, "R" is a $C_1-C_{10}$ alkyl group such as, for example, methyl, ethyl, propyl, butyl, and pentyl and "y" is an integer from 2 to about 30 and represents the degree of oligomerization of the alumoxane. Preferably, "R" is methyl and "y" is about 4 to about 25 and most preferably 6-25. Generally, in the preparation of alumoxanes from, for example, the reaction of trimethylaluminum and water, a mixture of linear and cyclic compounds is obtained. Generally, an alumoxane having a higher degree of oligomerization will, for a given metallocene, produce a catalyst complex of higher activity than will an alumoxane having a lower degree of oligomerization. Hence, the procedure by which alumoxane is produced by direct reaction of a trialkylaluminum with an undehydrated silica gel should insure the conversion of the bulk quantity of the trialkylaluminum to an alumoxane having a high degree of oligomerization. The desired degree of oligomerization is obtained by the order of addition of reactants as described hereinafter.

The metallocene may be any of the organometallic coordination compounds obtained as a cyclopentadienyl derivative of a transition metal. Metallocenes which are useful for preparing an active catalytic complex according to the process of this invention are the mono-, bi- and tri- cyclopentadienyl or substituted cyclopentadienyl metal compounds and most preferably, bi-cyclopentadienyl compounds. The metallocenes particularly useful in this invention are represented by the general formulas $(Cp)_mMR_nX_q$  I.

wherein Cp is a cyclopentadienyl ring, M is a group 4B or 5B transition metal and preferably a Group 4B transition metal, R is a hydrocarbyl group or hydrocarboxy group having from 1 to 20 carbon atoms, X is a halogen, and "m" is a whole number from 1 to 3, "n" is a whole number from 0 to 3, and "q" is a whole number from 0 to 3;

$(C_5R'_k)_gR''_s(C_5R'_k)MQ_{3-g'}$; 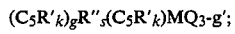

and $R''_s(C_4R'_k)_2MQ'$ 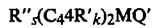 III.

wherein $(C_5R'_k)$ is a cyclopentadienyl or substituted cyclopentadienyl, each R' is the same or different and is hydrogen or a hydrocarbyl radical such as alkyl, alkenyl, aryl, alkylalryl, or arylalakyl radicals containing from 1 to 20 carbon atoms, a silicon-containing hydrocarbyl radical, or a hydrocarbyl radical wherein two carbon atoms are joined together to form a $C_4-C_6$ ring, R" is $C_1-C_4$ alkylene radical, a dialkyl germanium or silicone, or an alkyl phosphine or amine radical bridging two $(C_5R'_k)$ rings, Q is a hydrocarbyl radical such as aryl, alkyl, alkenyl, alkylaryl, or arylalkyl having 1-20 carbon atoms, hydrocarboxy radical having 1-20 carbon atoms or halogen and can be the same or different, Q' is an alkylidene radical having from 1 to about 20 carbon atoms, "s" is 0 or 1, "g" is 0, 1 or 2; when "g" is 0, "s" is 0; "k" is 4 when "s" is 1 and "k" is 5 when "s" is 0 and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary of the alkylidene radicals are methylidene, ethylidene and propylidene.

Of the metallocenes zirconocenes, titanocenes and hafnocenes are most preferred. Illustrative but non-limiting examples of these metallocenes which can be usefully employed in accordance with this invention are monocyclopentadienyl titanocenes such as cyclopentadienyl titanium trichloride, pentamethylcyclopentadienyl titanium trichloride, pentamethylcyclopentadienyl titanium trichloride; bis-cyclopentadienyl) titanium diphenyl; the carbene represented by the formula $Cp_2Ti=CH_2.Al(CH_3)_2Cl$ and derivatives of this reagent such as $CP_2Ti=CH_2.AL(CH_3)_3$, $(Cp_2TiCH_2)_2$, $Cp_2TiCH_2CH(CH_3)CH_2$, $Cp_2Ti=CHCH_2CH_2$, $Cp_2Ti=CH_2.AlR'''_2Cl$, wherein Cp is a cyclopentadienyl or substituted cyclopentadienyl radical, and R''' is an alkyl, aryl, or alkylaryl radical having from 1–18 carbon atoms; substituted bis(Cp)titanium(IV) compounds such as bis(indenyl)titanium diphenyl or dichloride, bis(methylcyclopentadienyl)titanium diphenyl or dihalides and other dihalide complexes; dialkyl, trialkyl, tetraalkyl and penta-alkyl cyclopentadienyl titanium compounds such as bis(1,2-dimethylcyclopentadienyl)-titanium diphenyl or dichloride, bis(1,2-diethylcyclopentadienyl)titanium diphenyl or dichloride and other dihalide complexes; silicone, phosphine, amine or carbon bridged cyclopentadiene complexes, such as dimethyl silyldicyclopentadienyl titanium diphenyl or dichloride, methylenedicyclopentadienyl titanium diphenyl or dichloride and other dihalide complexes and the like.

Illustrative but non-limiting examples of the zirconocenes which can be usefully employed in accordance with this invention are, cyclopentadienyl zirconium trichloride, pentamethylcyclopentadienyl zirconium trichloride, bis(cyclopentadienyl)zirconium diphenyl, bis(cyclopentadienyl)zirconium dichloride, the alkyl substituted cyclopentadienes, such as bis(ethyl cyclopentadienyl)zirconium dimethyl, bis(β-phenyl-propylcyclopentadienyl)zirconium dimethyl, bis(methylcyclopentadienyl)zirconium dimethyl, and dihalide complexes of the above; di-alkyl, tri-alkyl, tetra-alkyl, and penta-alkyl cyclopentadienes, such as bis(pentamethylcyclopentadienyl)zirconium dimethyl, bis(1,2-dimethylcyclopentadienyl)zirconium dimethyl, bis(1,3-diethylcyclopentadienyl)zirconium dimethyl and dihalide complexes of the above; silicon, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae $Cp_2Zr=CH_2P(C_6H_5)_2CH_3$, and derivatives of these compounds such as $Cp_2ZrCH_2CH(CH_3)CH_2$.

Bis(cyclopentadienyl)hafnium dichloride, bis(cyclopentadienyl)hafnium dimethyl, and the like are illustrative of hafnocenes.

Generally the use of a metallocene which comprises a bis(substituted cyclopentadienyl) zirconium will provide a catalyst complex of higher activity than a corresponding titanocene or a mono cyclopentadienyl metal compound. Hence bis(substituted cyclopentadienyl) zirconium compounds are preferred for use as the metallocene.

Preferably, the alumoxane component of the active catalyst complex is prepared by direct reaction of a trialkylaluminum with the material utilized as the catalyst support, namely an undehydrated silica gel. Silica useful as the catalyst support is that which has a surface area in the range of about 10 to about 700 $m^2/g$, preferably about 100–500 and desirably about 200–400 $m^2/g$, a pore volume of about 3 to about 0.5 cc/g and preferably 2–1 cc/g, and an adsorbed water content of from about 6 to about 20 weight percent, preferably from about 8 to about 15 weight percent. The average particle size of the silica should be from about $10\mu$ to about $100\mu$, and preferably from about $30\mu$ to about $60\mu$ ($1\mu = 10^{-6}$ m). Hereafter, silica having the above identified properties is referred to as undehydrated silica gel.

Undehydrated silica gel, as defined above, is added over time, about an hour, to a stirred solution of trialkylaluminum in an amount sufficient to provide a mole ratio of trialkylaluminum to water of from about 3:1 to 1:2, preferably about 1.2:1 to 0.9:1.

When used singularly the trialkylaluminum preferred for use in forming the alumoxane is trimethylaluminum (TMA). Next in order of preference, when used singularly, is triethylaluminum (TEAL). Also suitable for use as the trialkylaluminum are tripropylaluminum, tri-n-butylaluminum, tri-isobutylaluminum, tri(2-methylpentyl)aluminum, trihexylaluminum, tri-n-octylaluminum, and tri-n-decylaluminum. While, according to the process of this invention, a high activity supported catalyst may be produced exclusively from a trialkylaluminum, such as TEAL, the resultant catalyst will generally have a lower degree of catalytic activity than a catalyst of similar composition wherein the alumoxane cocatalyst is produced exclusively from TMA.

Upon addition of the undehydrated silica gel to the solution of trialkylaluminum, the water content of the silica gel controllably reacts with the trialkylaluminum to produce an alumoxane having a degree of oligomerization of about 6–25 (y=6–25) which is deposited onto the surface of the silica gel particles. Although the reaction of the trialkylaluminum with the water content of the silica gel proceeds relatively quickly, that is, it is generally completed within the time of about 5 minutes, it does not occur with the explosive quickness of that which occurs with free water. The reaction may be safely conducted in conventional mixing equipment under a mantle of inert gas.

The metallocene is then added to the stirred suspension of alumoxane silica gel produce in an amount sufficient to provide a mole ratio of aluminum to transition metal of from about 1000:1 to about 1:1, preferably from about 300:1 to about 10:1 and most preferably from about 150:1 to about 30:1. The mixture is stirred for about 30 minutes to about one hour at ambient or an elevated temperature of about 75° C. to permit the metallocene to undergo complete complexing reaction with the adsorbed alumoxane. Thereafter, the solvent is removed.

Most preferably, the solvent is removed by filtering or evaporation. The residual solids are dried to a free-flowing powder.

The dried free-flowing powder comprises a metallocene alumoxane complex adsorbed upon the surface of the silica gel support particles. The dried state composition exhibits a level of catalytic activity useful for gas phase polymerization of ethylene.

The solvents used in the preparation of the catalyst system are inert hydrocarbons, in particular a hydrocarbon that is inert with respect to the catalyst system. Such solvents are well known and include, for example, aliphatic hydrocarbons such as isobutane, butane, pentane, hexane, heptane, octane, cyclohexane, methylcyclohexane, and aromatic hydrocarbons such as toluene, xylene and the like. The less toxic aliphatic hydrocarbon solvents are preferred for use.

The water content of the undehydrated silica gel influences final catalyst activity. Hence the hydehydrated silica gel should have an adsorbed water content of from about 6 to about 20 weight percent. Preferably the adsorbed water content should be from about 8 to about 15 weight percent.

Further influencing the degree of activity attained in the final supported catalyst complex is the mole ratio of trialkylaluminum to the adsorbed water content of the undehydrated silica gel. The quantities of trialkylaluminum employed should, in comparison to the quantity of undehydrated silica gel of specified adsorbed water content, be selected to provide a mole ratio of trialkylaluminum to water of from about 3:1 to about 1:2, preferably from about 1.5:1 to about 0.8:1, more preferably from about 1.2:1 to about 0.9:1. It has been observed that for a given metallocene, a maximum catalyst activity is generally observed in the trialkylaluminum to water mole ratio range of about 1.2:1 to about 0.9:1. Depending upon the particular trialkylaluminum selected for use, commercially acceptable catalyst activities are exhibited in the trialkylaluminum to water mole ratio range of about 3:1 to about 1:2.

Influencing the cost of production and the level of catalytic activity obtained in the final supported catalyst complex is the mole ratio of aluminum to transition metal of the metallocene component. The quantity of metallocene added to the alumoxane adsorbed silica gel solids should be selected to provide an aluminum to transition metal mole ratio of from about 1000:1 to about 1:1, preferably from about 300:1 to about 10:1, and most preferably from about 150:1 to about 30:1. From the standpoint of economic considerations it is desirable to operate in the lower ranges of the aluminum to transition metal mole ratio in order to minimize the cost of catalyst production.

The type of trialkyaluminum utilized for production of the alumoxane also exerts an influence over the degree of catalytic activity that can be achieved in the final catalyst composition. Heretofore trimethylaluminum has been the trialkylaluminum of preference since it yields methylalumoxane (MAO). Metallocenes cocatalyzed with methylalumoxane exhibit substantially greater catalytic activities than when cocatalyzed by other types of alumoxanes. The level of catalyst activity which can be attained with a given trialkylaluminum compound decreases as the size of the alkyl substituents increases.

However, a final supported catalyst having a degree of catalytic activity comparable to one of like Al:transition metal ratio and metallocene composition but which is cocatalyzed exclusively with methylalumoxane can be obtained by reacting a trialkylaluminum other than TMA with undehydrated silica followed by depositing a prereacted metallocene - TMA mixture on the treated silica support. In this embodiment of the invention, the trialkylaluminum coated silica gel is produced by treating an undehydrated silica gel with the trialkylaluminum. The respective alkylalumoxane coated silica gel is then treated with the product which results from the addition of trimethylaluminum to metallocene. Preferably the treatment of the undehydrated silica gel with the trialkylaluminum and the treatment of the metallocene with trimethylaluminum (TMA) are carried out in one of the inert solvents referenced above. Following addition of the TMA treated metallocene product to the trialkylaluminum treated silica gel, the solvent is removed and the solids dried to a free-flowing powder. This embodiment is particularly preferred when the referenced trialkyaluminum is triethylaluminum.

A catalyst composition wherein the alumoxane cocatalyst is produced exclusively from TMA generally has a catalytic activity (measured as g polymer/g transition metal/hr) higher than a catalyst of similar composition wherein the cocatalyst alumoxane is produced exclusively from TEAL. In accordance with this embodiment of this invention, a catalyst composition produced by addition of a TMA treated metallocene to a TEAL treated undehydrated silica gel will have an activity at least comparable to a catalyst of like metallocene composition and Al:transition metal ratio provided that the quantity of TEAL utilized is in a mole ratio to the water content of the undehydrated silica gel of from about 1.2 to about 0.9, mole sum of TEAL and TMA in mole ratio to the water content of the undehydrated silica gel is from about 1.2 to about 0.9. Within such values the quantity of TEAL which may be employed constitutes on a mole basis over 99% of the alumoxane cocatalyst requirement. Hence on a mole basis the ratio of TMA to TEAL utilized in production of the final supported catalyst composition ranges from about 0.01 to about 100.

Further, in accordance with this invention, a polyethylene having the desired molecular weight can be obtained by careful monitoring the amount of hydrogen employed during the polymerization. In particular, a direct correlation exists between the molecular weight of the polymeric wax obtained from the process of this invention and the amount of hydrogen employed during polymerization. Most particular, the molecular weight is most suitably controlled with hydrogen when the polymerization is carried out at relatively low temperatures, e.g. from about 25° to about 180° C.

In accordance with the invention, it is desirable to employ from about 0.01 to about 20 mole percent of hydrogen based on the total mole percent of hydrogen and ethylene. However, greater or lessor amounts can be employed as long as the desired wax is obtained. Temperature control can also be employed together with hydrogen in order to obtain the desired molecular weight of wax product.

By appropriate selection of the type and relative amounts of the metallocene and the trialkylaluminum cocatalyst precursor, one can attain by the present method the particular application. For example, higher concentrations of alumoxane in the catalyst system generally result in higher molecular weight polymer product. Therefore, when it is desired to produce a high molecular weight polymer a higher concentration of trialkylaluminum is used, relative to the metallocene, than when it is desired to produce a lower molecular weight material. For most applications the ratio of aluminum in the aluminum alkyl to total metal in the metallocene can be in the range of from about 300:1 to about 20:1.

The processing parameters for the process of this invention are typical of the traditional gas phase processes. The polymerization temperature can be typically in the range of 25° C. to about 180° C.; the pressures in the range of about 100 psi to about 500 psi.

EXAMPLE 1

A silica gel supported ([nBuCp]$_2$ZrCl$_2$)-methyl alumoxane catalyst complex was prepared, as follows:

Two hundred sixty (260) milliliters of trimethylaluminum/heptane solution (15%, 1.62 M) and 300 ml of heptane were charged into a dried one liter three neck flask containing a magnetic stirring bar. Thereafter 100 g of undehydrated silica gel (Davison 948) which contains 7.63 weight percent water was added slowly into the flask through a solids additional vessel. The resulting mixture was allowed to react under stirring at room temperature for 1 hour. Thereafter 2.50 g of bis(n-butylcyclopentadienyl)zirconium dichloride ([n-BuCp]$_2$ZrCl$_2$) dissolved in 120 ml heptane was injected into the flask and the resulting mixture was allowed to react under stirring for 30 minutes. The volatile solvent was then removed by nitrogen purging at 75° C. and the residual solids were dried to a free-flowing powder by vacuum drying at ambient temperature.

The resulting free-flowing powder comprised a metallocene methyalumoxane catalyst complex supported on a silica gel wherein the mole ratio of aluminum to zirconium is 67.4:1.

EXAMPLE 2

The procedure of Example 1 was followed with the exception that 260 ml of triethylaluminum/heptane solution (25%) was charged into a one liter flask followed by the addition of 100 g of undehydrated silica gel (Davison 948) which contained 8.10 weight percent water.

EXAMPLE 3

Comparative

A one liter three-neck flask equipped with a magnetic stirring bar was charged with 100 g of silica gel (Davison 948) that had been dehydrated at 800° C. A quantity of 330 ml of methylalumoxane/toluene solution (10%) and 250 ml of toluene were added into the flask. After the addition the mixture was stirred at ambient temperature for one hour.

A quantity of 2.5 g di-(n-butylcyclopentadienyl) zirconium dichloride dissolved in 40 ml of toluene was added into the flask. The mixture was allowed to react at 75° C. for 30 minutes.

The mixture in the flask was kept at 75° C. in an oil bath while a nitrogen gas was purged through the flask to remove the solvent. The heating and nitrogen purging were stopped when the mixture in the flask turned into a solid form. The mixture was then dried under vacuum to form a free-flowing powder.

Catalyst Test

The activity of the catalysts of Examples 1-3 was determined in a continuous fluid bed gas phase polymerization reactor at 300 psig total pressure and 60° F.

During the polymerization, ethylene, hydrogen and nitrogen (as a diluent) were continuously fed into the reactor to maintain the following gas concentrations:

| Ethylene | 40 mole percent |
|---|---|
| Nitrogen | 53 mole percent |
| Hydrogen | 7 mole percent |

The velocity of the gas in the reactor was 0.7 ft/sec. The catalyst was continuously fed into the reactor to maintain a constant production rate of 70 g/hr. (The catalyst feeding rate was approximately 0.5 g/hr.) Polymerization was continued for a time sufficient to provide three reactor turnovers before the desired product was collected (i.e., the equivalent of three times the volume of polymer in the reactor was removed before the product properties were determined). The polymers had the following properties:

| Catalyst Example No. | Sample | Collecting Time (hr.)[1] | Wt. | Mw/Mn | M.P. (° C.)[2] |
|---|---|---|---|---|---|
| 1 | A | 0 | 1400 | 3.59 | — |
|   | B | 15 | 1700 | 3.99 | — |
|   | C | 28 | 1100 | 3.38 | — |
| 2 | A | 0 | 1900 | 4.17 | — |
|   | B | 15 | 1700 | 3.85 | — |
|   | C | 30 | 2000 | 4.19 | — |
| Comparative |  |  |  |  |  |
| 3 | A | 24 | 1300 | 2.85 | 115 |
|   | B | 60 | 1100 | 2.71 | 109 |

[1]Hours after three bed turnover
[2]DSC second melt

The invention has been described with reference to its preferred embodiments. From this description, a person or ordinary skill in the art may appreciate changes that could be made in the invention which do not depart from the scope and spirit of the invention as described above and claimed hereafter.

I claim:

1. A process for preparing polyethylene wax having a narrow molecular weight distribution of 5 or less, which comprises polymerizing ethylene in a gas phase polymerization reactor in the presence of:
   (a) a catalytically effective amount of a dried free-flowing powder comprising a Group IV B or V B transition metal metallocene-alumoxane catalyst complex adsorbed upon the surface of silica gel said complex having an aluminum to transition metal mole ratio of 1000:1 to 1:1; and
   (b) from about 0.01 to about 20 mole percent of hydrogen based on the total weight percent of hydrogen and ethylene.

2. The process of claim 1, wherein the particles of said undehydrated silica gel have an average surface area in the range of about 10 m²/g to about 700 m²/g.

3. The process of claim 1, wherein the molecular weight distribution is 3 or less.

4. The process of claim 1, wherein the average particle size of said undehydrated silica gel is from about 10μ to about 100μ.

5. The process of claim 1, wherein said undehydrated silica gel has a pore volume of from about 0.5 to about 3 cc/g.

6. The process of claim 1, wherein said undehydrated silica gel has a water content of from about 6 to about 10 weight percent.

7. The process of claim 1, wherein said aluminumtrialkyl is trimethylaluminum, triethylaluminum, or mixtures thereof.

8. The process of claim 1, wherein said metallocene is a compound selected from the group consisting of:
   (a) $(Cp)_m MR_n X_q$;
   (b) $(C_5 R'_k)_g R''_s (C_5 R'_k) MQ_{3-g}$; and
   (c) $R''_s (C_5 R'_k)_2 MQ'$ wherein Cp is a cyclopentadienyl ring, M is a Group 4B or 5B transition metal, R is a hydrocarbyl group or hydrocarboxy group having from 1 to 20 carbon atoms, X is a halogen, and m is a whole number from 1 to 3, n is a whole number from 0 to 3, q is a whole number from 0 to 3, $(C_5 R'_k)$ is a cryclopentadienyl or substituted cyclopentadienyl, each R' is the same or different and is hydrogen or a hydrocarbyl radical containing from 1 to 20 carbon atoms, a silicon-containing hydrocarbyl radical, or a hydrocarbyl radical wherein two carbon atoms are joined together to form a $C_4$-$C_6$ ring, R" is $C_1$-$C_4$ alkyene radical, a dialkyl germanium or silicone, or an alkyl phosphine or amine radical bridging two $(C_5 R'_k)$ rings, Q is a hydrocarbyl radical having 1-20 carbon atoms, hydrocarboxy radical having 1-20 carbon atoms or halogen and can be the same or different, Q' is an alkylidene radical having from 1 to about 20 carbon atoms, s is 0 or 1, g is 0, 1 or 2; when g is 0, s is 0; k is 4 when s is 1 and k is 5 when s is 0.

9. The process of claim 8, wherein said metallocene is zirconocene or titanocene.

10. The process of claim 9, wherein said zirconocene is selected from the group consisting of cyclopentadienyl zirconium trichloride; pentamethylcyclopentadienyl zirconium trichloride; bis(cyclopentadienyl)zirconium diphenyl; bis(cyclopentadienyl)zirconium dichloride; alkyl substituted cyclopentadienes, and their dihalide complexes; dialkyl, trialkyl, tetra-alkyl, and penta-alkyl cyclopentadienes, and their dihalide complexes; and silicone, phosphorus, and carbon bridged cyclopentadiene complexes.

11. The process of claim 9, wherein said titanocene is selected from the group consisting of monocyclopentadienyl titanocenes; bis(cyclopentadienyl) titanium diphenyl; carbenes represented by the formula $Cp_2 Ti = CH_2 \cdot Al(CH_3)_2 Cl$ and their derivatives, wherein Cp is a cyclopentadienyl or substituted cyclopentadienyl radical; substituted bis(Cp)Ti(IV) compounds and their dihalide complexes; dialkyl, trialkyl, tetra-alkyl and penta-alkyl cyclopentadienyl titanium compounds and their dihalide complexes; and silicone, phosphine, amine or carbon bridged cyclopentadiene complexes, and their dihalide complexes.

12. The process of claim 8 wherein said metallocene is trimethylaluminum treated metallocene comprising the reaction product of trimethylaluminum and metallocene.

* * * * *